United States Patent [19]

Mihm, Jr.

[11] Patent Number: 5,003,593

[45] Date of Patent: Mar. 26, 1991

[54] TELECONFERENCING METHOD FOR A SECURE KEY MANAGEMENT SYSTEM

[75] Inventor: Thomas J. Mihm, Jr., Mesa, Ariz.

[73] Assignee: Motorola, Inc., Schaumburg, Ill.

[21] Appl. No.: 361,898

[22] Filed: Jun. 5, 1989

[51] Int. Cl.$^5$ .............................................. H04L 9/02
[52] U.S. Cl. ...................................... 380/21; 380/25; 380/46; 380/49; 379/202
[58] Field of Search ............................. 380/21, 23–25, 380/28–30, 49, 50, 46; 340/825.34; 379/93, 202

[56] References Cited

U.S. PATENT DOCUMENTS

| | | | |
|---|---|---|---|
| 3,674,936 | 7/1972 | Wolfe | 380/49 |
| 4,182,933 | 1/1980 | Rosenblum | 380/21 |
| 4,649,233 | 3/1987 | Bass et al. | 380/21 |
| 4,888,801 | 12/1989 | Foster et al. | 380/21 |

*Primary Examiner*—Stephen C. Buczinski
*Assistant Examiner*—Bernarr Earl Gregory
*Attorney, Agent, or Firm*—Frank J. Bogacz

[57] ABSTRACT

A secure teleconferencing method for a key management system is shown. This method directly establishes a secure teleconference among a number of terminals without the intervention of a certifying authority. The terminals of this system have been previously certified by a common certification authority. Upon detection of a secure teleconference, the terminals orient themselves in a master/slave configuration. The terminals exchange certification messages. As a result, each terminal determines the identity of the other terminals. Under the supervision of the master terminal, the terminals establish a single session, session key which permits secure communication among the terminals. A new session key is pseudorandomly generated for each teleconference call. A minimum number of messages is exchanged to establish the secure teleconference.

18 Claims, 5 Drawing Sheets

TELECONFERENCING METHOD FOR A SECURE KEY MANAGEMENT SYSTEM

BACKGROUND OF THE INVENTION

The present invention pertains to secure communications among users of a key management system and more particularly to a method for providing secure teleconferencing through the use of an unforgeable certification process.

In modern day telephony, specialized circuitry within the switching system provides for teleconferencing. Teleconferencing is simultaneous voice or data exchange between three or more users of a communication system. Typically, specialized networks and circuitry within the network of a switching system provide for interconnecting a number of users in a teleconference.

In secure communications systems, the problems of establishing connections among multiple users for voice or data exchange is further complicated by various security protocols. Establishing a secure teleconference between multiple users via a secure network of a switching system is very difficult. This is due to the fact that the terminal devices in a secure teleconferencing system may demand point-to-point, on-line establishment of traffic keys.

Further, establishing a session key between terminal devices connected to a secure network of a switching system requires transmission of many messages between the system and the users. This is very cumbersome and time consuming.

An object of the present invention is to provide a method to enable any number of terminal devices connected to a switching network to establish a secure conference arrangement by establishing an unforgeable certification method to provide a single session traffic key with a minimal number of point-to-point message exchanges between the terminal devices.

SUMMARY OF THE INVENTION

In accomplishing the object of the present invention, a novel teleconferencing method for a secure key management system is shown.

A secure teleconferencing method is achieved among a number of interconnected terminals via a switching network. Each of the terminals have previously been certified by a common authority. The secure teleconferencing method first establishes that all the teleconferenced terminals have previously been certified. Each terminal established that all the remaining terminals have been previously certified by a common authority. Then, the terminals collectively develop a unique, single session, session key for providing secure voice and data communication among the interconnected terminals.

DESCRIPTION OF THE PREFERRED EMBODIMENT

Figure 1:
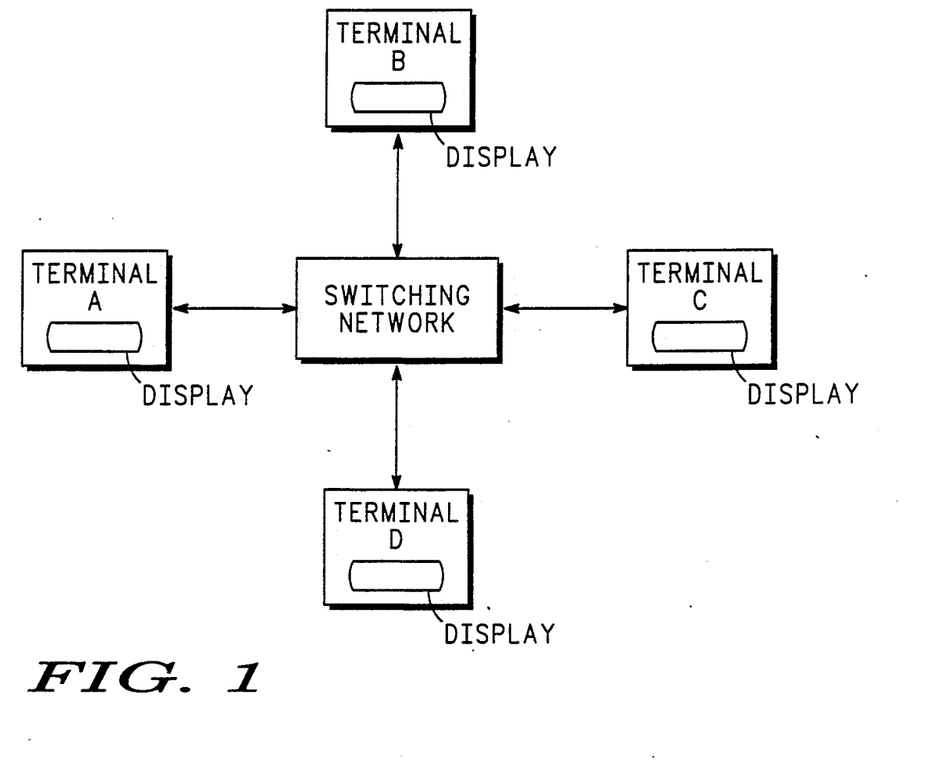
FIG. 1 is a block diagram of a teleconferencing arrangement via a switching network.

FIG. 1 depicts a number of terminals (A, B, C and D) connected to a switching network. This switching network includes circuitry which can provide for teleconferencing among these four terminals. Four terminals are shown here by way of example and not by way of limitation. Almost any number of terminals may be connected in the teleconferencing arrangement. The only limitations are the number of terminals which may physically be interconnected by the switching system.

In the present system, each of the terminals is a secure voice and data terminal. Each terminal includes the present secure teleconferencing method. This method may typically be implemented in software. However, hardware implementations are also possible.

The secure terminals A-D are designed for both full duplex and half duplex voice and data communication. Half duplex voice and data communication takes place over two wire communication networks. Full duplex voice and data communication occurs over four-wire telecommunication networks. For full duplex transmission, information is received and transmitted over two separate pairs of wires (channels) simultaneously. In half duplex transmission, a terminal puts energy on the line only when transmitting information. When its transmission is complete, its energy is removed allowing another terminal to transmit on the same channel. Teleconferencing is much more straight forward in the half duplex configuration, since energy is on the line only when a particular terminal is transmitting.

The present method pertains more readily to the half duplex communication mode. However, via time sharing existing channels or establishing a new channel, one per added terminal, this method is also applicable to the full duplex transmission mode. Each of the terminals A-D include a half duplex modem. Each terminal includes input devices such as a push button for indicating that the teleconferencing mode is selected and that the secure mode is selected. Each terminal also includes the ability to display the identify of each of the other teleconferencers. These identities may be scrolled on a visual display for the user of each terminal.

For security, each of the terminals employ a type of asymmetric RSA public encryption and private decryption process. The encryption process is noted by EM and the decryption process is noted by DM.

Figure 2A:
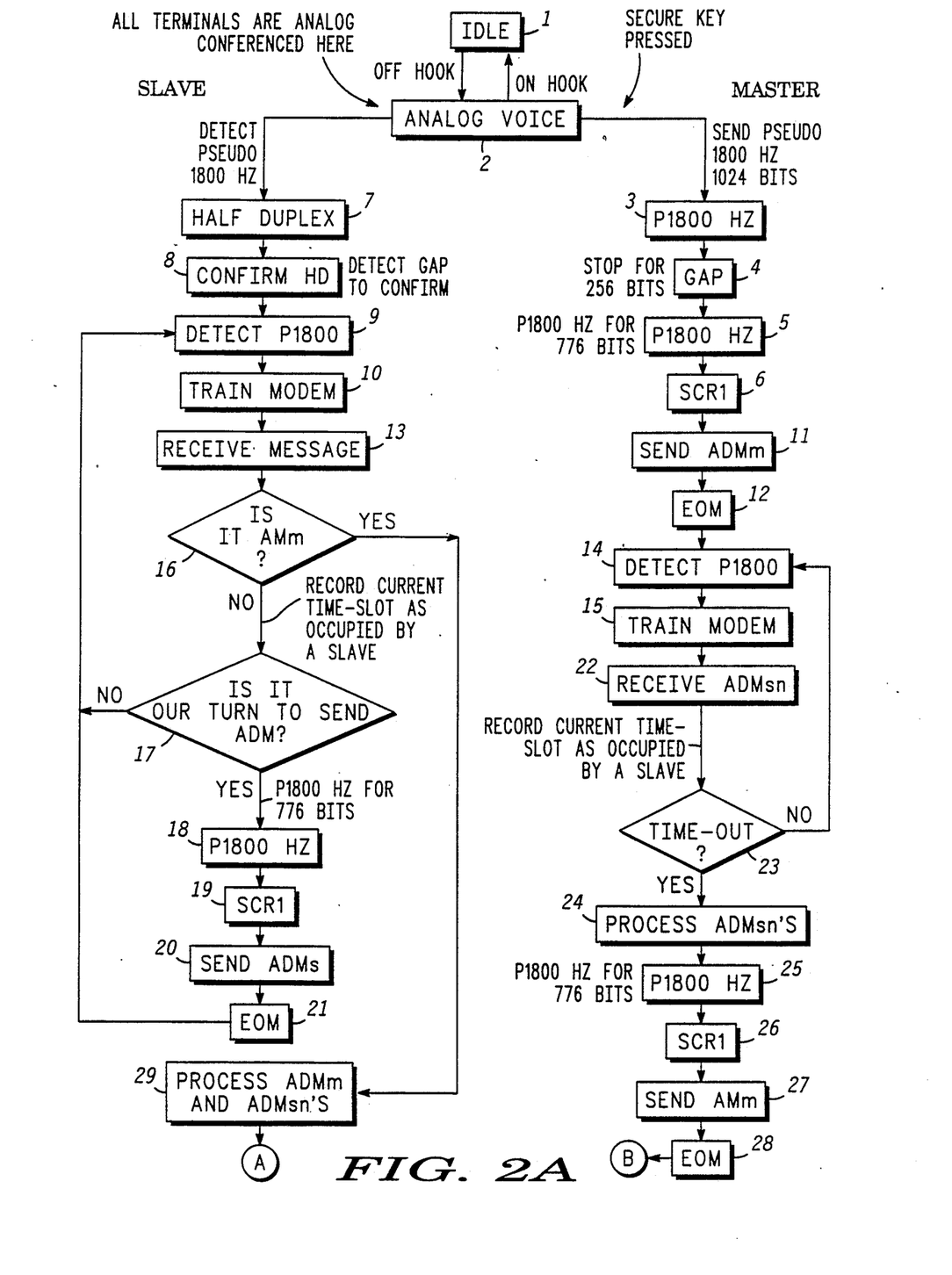
FIGS. 2A and 2B are flow charts of a secure teleconferencing method embodying the principles of operation of the present invention.
Figure 2B:
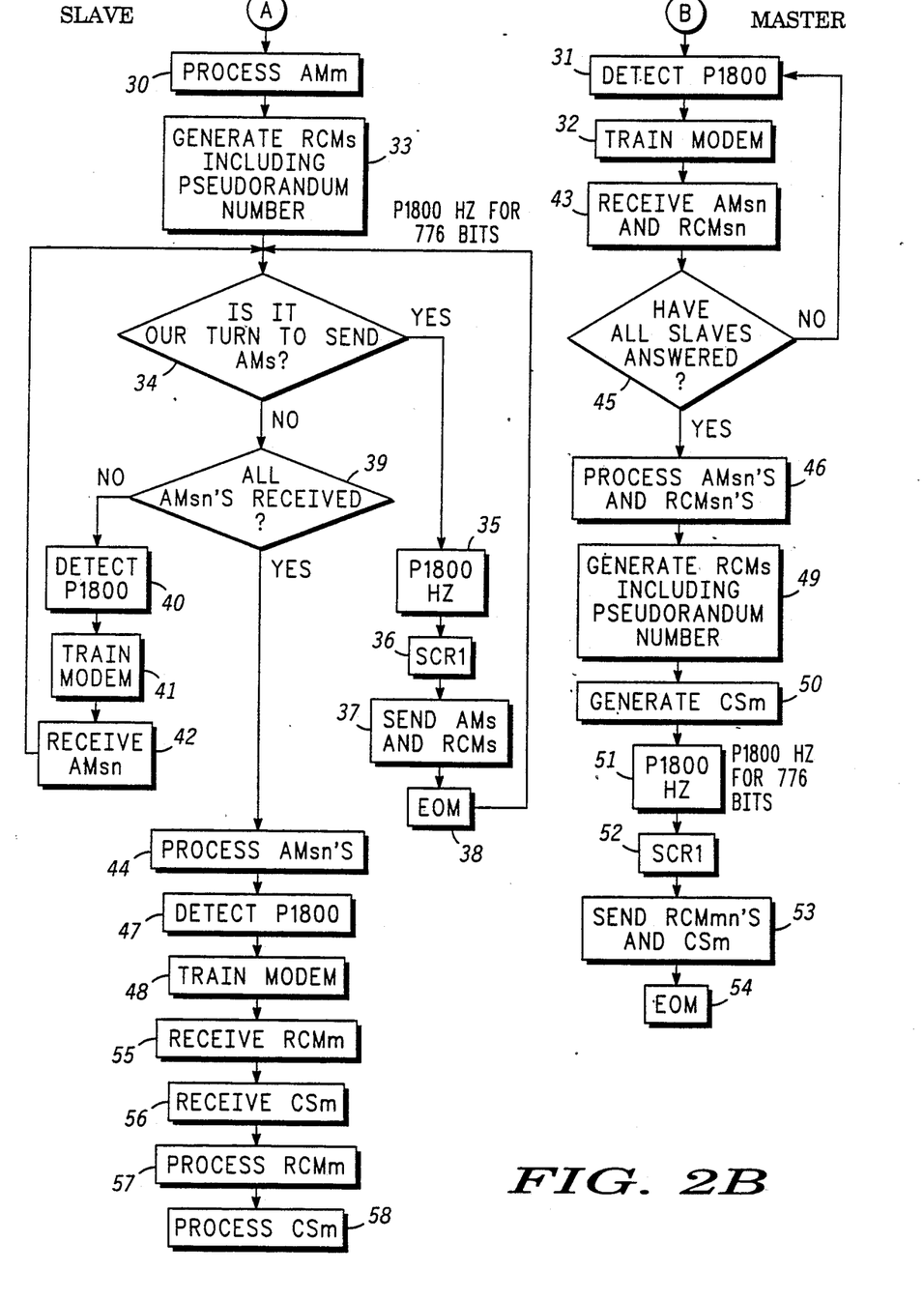

Turning now to FIGS. 2A and B, the secure teleconferencing method is shown. First, the users go off hook, block 1. Next, all the users are established in an unsecured teleconferenced arrangement via a usually switching system procedures, block 2. This is accomplished in the typical manner through conference circuitry in the switching network. The call or data transmission at this point is unsecured.

To accomplish the teleconference, each of the users of terminals A-D selects the conference mode via pushing a conference push button on his or her terminal. Next, one of the users presses the secure key on his or her terminal, block 3. This serves two functions. First, that terminal becomes the master terminal for controlling the teleconference function. Since all of the terminals include the present method, any of the terminals may be the master for the teleconference. The determination of the master terminal for teleconference is determined by the first to press the secure key on his terminal.

The second function of the master terminal is to transmit its access domain message in half duplex to each of the other conferenced terminals. To accomplish this, the master transmits P1800 data, block 3, stops transmitting for 256 bits (block 4), and sends P1800 data of 776 bits (block 5) followed by SCRI data (scrambled ones for synchronization), block 6. Meanwhile, the slaves are set in the half duplex mode, block 7. The slave confirms the stop gap, block 8. The slaves detect the P1800 data, block 9, and train their modem to receive, 10. The master sends the access domain message (ADM), 11. This is followed by an end of message (EOM) indication, block 12.

Next, each slave receives the access domain message and stores it for later processing, block 13. The access domain messages of the master and other slave terminals are processed when the master's authentication message has been received.

Figure 3A:
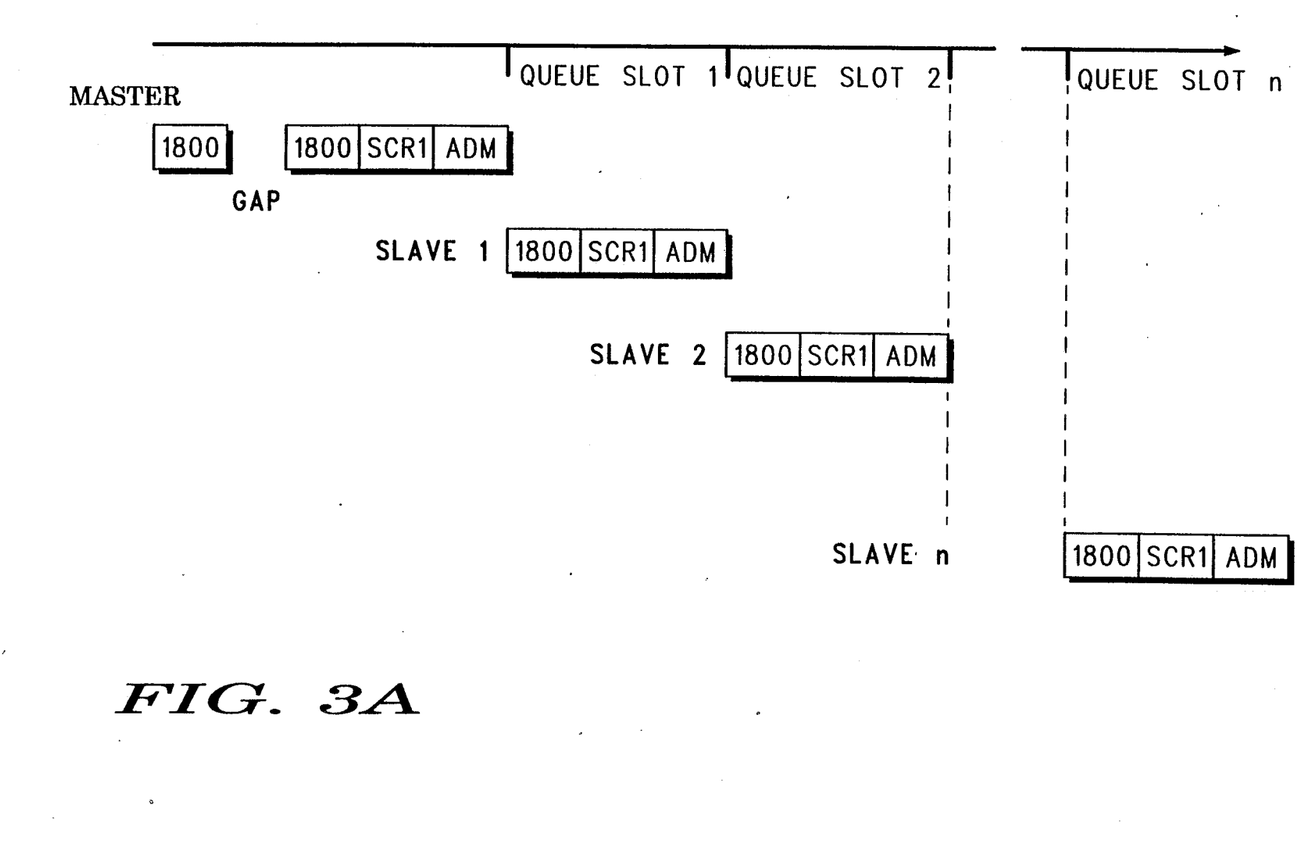
FIGS. 3A and 3B are timing diagrams of inter-terminal message transmission

The transmission of master's access domain message occurs as shown in FIG. 3A. The master first sends a P1800 protocol, followed by a gap, followed by another P1800 protocol, an SCRI (scrambled 1's and 0's for modem synchronization) bit stream and then the bit stream of the access domain message, followed by an end of message (not shown). Each slave then responds in an appropriate time slot, is determined by a queue index function. This queue index function may be implemented in a number of ways, such as, a strictly arbitrary sequence.

The master terminal then sets its modem in the receive mode, blocks 14 and 15.

Next, each slave in the teleconference responds with its access domain message in the selected time slot. Since the slave terminals have received the master's access domain message, the NO path has been followed from block 16 to block 17. Next, it is the slave's turn to send its access domain message, the YES path is followed from block 17 to block 18. In FIG. 3A, slave 1 responds with its P1800 protocol (block 18) followed by SCR1 (block 19), and its access domain message ADM block 20 followed by EOM, block 21. Similarly, each slave responds in its time slot. Slave 2 responds in time slot 2. Slave n responds in time slot n. The master terminal receives all the access domain messages of each of the slaves, block 22. Block 23 determines whether all the slaves have responded. If all the slaves have not responded, block 23 transfers control to block 14 to wait for a response. When all the slave terminals respond, for master (block. 24) processes the access domain messages of each of the slaves.

Next, the master sends its authentication message to each of the slaves, blocks 25 through 28. The authentication message of the master terminal is given by equation (1).

$$AM_m = [(ID_{master}, EM_{master})] \times DM_{kca} \qquad \text{Equation (1)}$$

The Authentication Message identifies the particular master terminal, its public or encrypt key and the private decrypt key of its certification authority (KCA). This message is valid only if it is certified by the key certification authority. Further, each of the other terminals may decode this message only if they are certified under the same key certification authority.

Figure 3B:
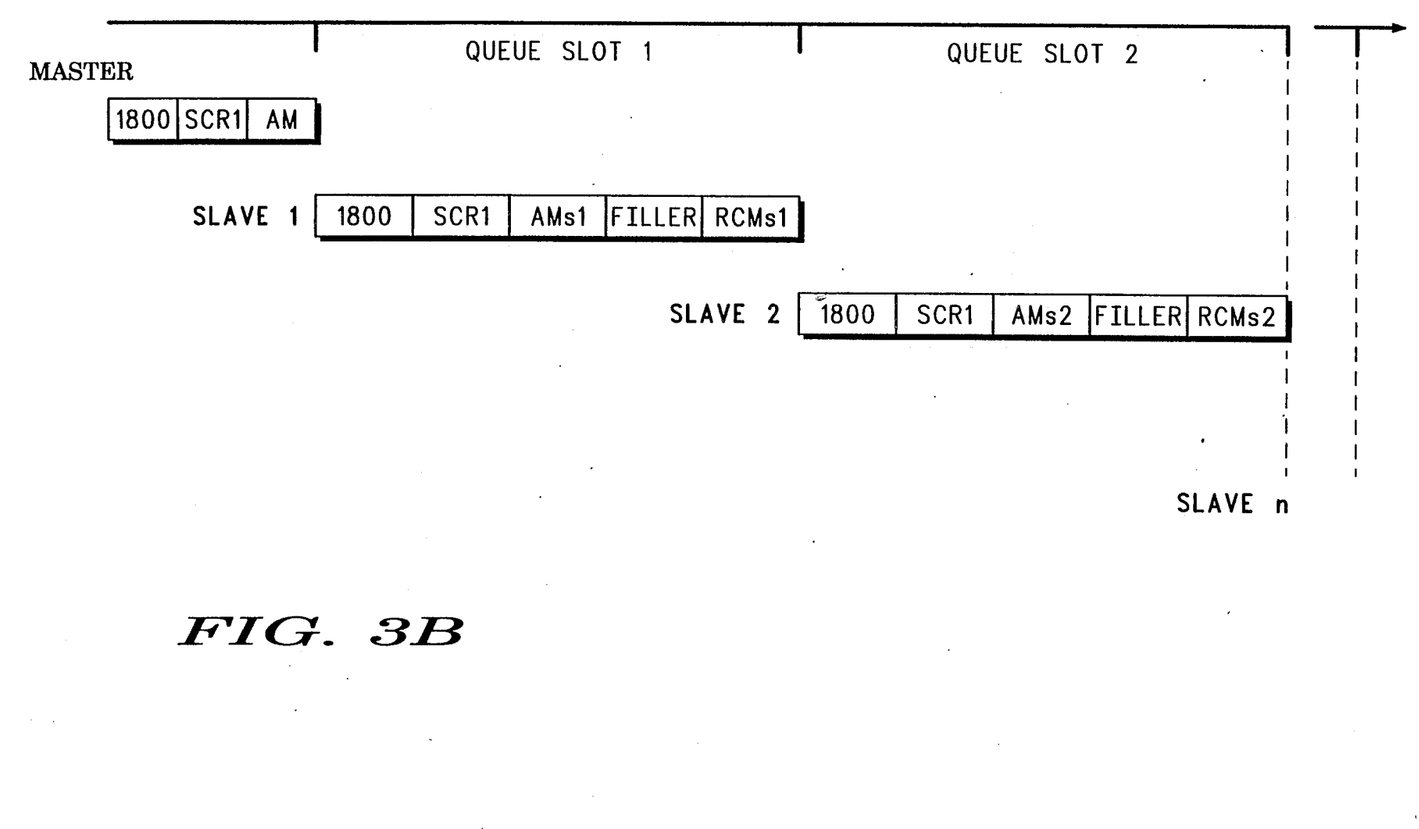

Block 16 determines for each slaves terminal that this is the authentication message. As a result, block 16 transfers control to block 29 which process the master access domain message ($ADM_m$) and the other slaves' access domain messages ($ADM_{sn}$'s). Once the access domain messages have been thereby exchanged, each terminal can determine the identity of the terminal to which it is connected via the teleconference and that they are certified by a common certifying authority such as a KCA. FIG. 3B depicts this transmission of the master. This transmission consists of the 1800 protocol followed by the SRC1 bits, followed by the authorization message and an EOM (not shown). The master terminal sets itself to receive the authentication messages of the slaves, blocks 31 and 32. Next, each slave terminal processes the authentication message of the master ($AM_m$), block 30. Each slave terminal generates a unique pseudorandom number ($RN_s$) and a pseudorandom component message (RCM) from the pseudorandom number, block 33. The RCM is made by encrypting the slave's unique pseudorandom number in the master's public key as shown in Equation (2):

$$(RN_s(n)) \times EM_{master} = RCM_s(n) \qquad \text{Equation (2)}$$

Each slave, then, stores a copy of its unique pseudorandom number for later use in the final stages of this process. Each slave then responds in its appropriate time slot with its authorization message followed by its pseudorandom component message. The slave authorization message is similar to the master's authorization message. It is shown in Equation (3).

$$AM_s = [(ID_{slave}, EM_{slave})] \times DM_{kca} \qquad \text{Equation (3)}$$

It includes the identity of the slave, the public key of the slave covered by the private key of the certifying authority or KCA.

When each slave determines that its time slot is present, that slave "broadcasts" its authorization message ($AM_s$), block 34. The slave terminal initialize its modem, blocks 35 and 36. Next, the authorization message ($AM_s$) and pseudorandom component message (RCMs) of each slave is transmitted to each of the other slaves, including the master terminal, block 37, followed by an end of message (EOM), block 38. Block 38 transfers control to block 34. Since this slave terminal has transmitted its $AM_s$ and $RCM_s$, block 34 transfers control to block 39.

The transmission for slave 1 is shown in FIG. 3B. First the 1800 protocol is sent, then the SCR1 bits, the authorization message of slave 1, followed by approximately 200 milliseconds of filler which is a predefined binary bit pattern and finally the pseudorandom component message of the slave 1 and end of message indication (not shown). Each slave similarly responds in its assigned time slot.

Each slave terminal sets its modem to receive the other terminals $AM_s$ and $RCM_s$ messages, blocks 40 and 41. Each slave terminal receives the other slave terminals, $AM_s$ and $RCM_s$, block 42. Also, simultaneously the master terminal receives each of the slave terminals' $AM_s$ and $RCM_s$ messages, block 43.

When all the slave terminals have responded, each block 39 of each slave terminal transfers control to block 44. Simultaneously, when the master terminal has received all the $AM_s$ and $RCM_s$ messages, block 45 transfers control to block 46.

The pseudorandom component message of each terminal includes a unique pseudorandom number generated by that terminal. This pseudorandom number is transmitted to the master terminal and is also stored within the terminal. The pseudorandom number is encrypted with the master's public key to form the pseudorandom component message. Therefore, even through all of the other slave terminals in the teleconference may receive the RCM, they will not be able to decrypt it.

As a result of these transmissions, each slave terminal receives all the authorization messages of the other terminals. Each slave then processes each of the authorization messages of the other slaves, block 44. This includes extracting the identity of each of the other slaves which have been covered by the private key of the certifying authority. The identity of each of the slaves is then scrolled on a viewing device of the terminal in the order in which they are received. As a result, each terminal has established the certified identity of each of the other conferees.

The master terminal has also received each of the authentication messages of the other terminals and processed them similarly to that described above for the slave, block 46. Next, the master decrypts each of the slave's pseudorandom component message, block 46. Since each of the slave's pseudorandom component message has been covered with the master's public key, the master may decrypt them by applying his private key since this is an asymmetric or one-way function. Each slave sets its modem to receive a message from the master terminal, blocks 47 and 48.

When the master terminal receives each of the authorization messages, it decodes each of the other terminals' identification. In addition, the master terminal then scrolls each of the identities of the slave terminals on each visual display on the terminal. Next, the master terminal decrypts each of the slave's pseudorandom component message. Since each of the slaves have covered their pseudorandom component with the master's public encrypt key, only the master is able to decode each of the pseudorandom component messages by application of his private decrypt key. The pseudorandom component is a predetermined number of bits of information. The pseudorandom component is, as its name implies, generated pseudorandomly by each of the terminals. The larger in terms of bits the pseudorandom component is, the more difficult this component is to determine for purposes of listening. As a result, the master terminal obtains each of the slave terminals pseudorandom components. In addition, the master terminal has stored its previously generated pseudorandom component.

Next, the master terminal generates a set of pseudorandom numbers based upon each of the slave's pseudorandom numbers and the master's pseudorandom component or number block 49. The equations for generating this set of pseudorandom numbers are shown by Equation Set (4).

bers are exclusive-ORd. Each of the + symbols represents an exclusive-OR operation. The new pseudorandom number for slave 2 $RNs(2)'$ is an exclusive-OR of each of the other terminal's pseudorandom numbers except terminal 2.

As a result, the master terminal generates one new pseudorandom number for each of the terminals in the teleconference which is an exclusive-OR of all the other terminals in that teleconferenced pseudorandom number except the terminal to which that pseudorandom number is to be sent.

Figure 4:
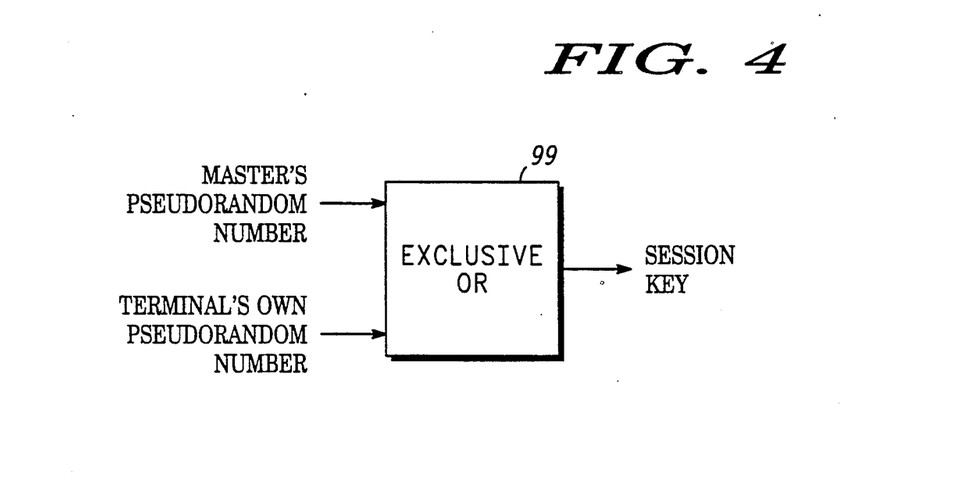
FIG. 4 is a block diagram depicting the exclusive-OR operation of each terminal.

The terminal to which the pseudorandom number is to be sent has previously stored its own pseudorandom number. Therefore in FIG. 4, when a given terminal receives the new pseudorandom number from the master terminal, it must simply exclusive-OR 99 its own stored pseudorandom number with the primed pseudorandom number sent from the master terminal. As a result, the terminals have developed a session key. This session key is useful only for this session and is generated for each teleconference call. The generation and transmission of the session key also obeys the "two-man rule", in that interception of a single message will not result in obtaining the pseudorandom component and hence, the session key.

The master terminal covers each of the newly generated primed pseudorandom numbers with the public encrypt key of the slave terminal to receive that random number as shown in Equation Set (5):

$$[RN(1)']xEM_{slave1} = RCMm(1)$$
$$[RN(2)']xEM_{slave2} = RCMm(2)$$

$$\{RN(n-1)'\}xEM_{slave}(n-1) = RCMm(n-1)$$
$$\{RN(n)'\}xEM_{slave}(n) = RCMm(n)$$

Again, since the new primed pseudorandom number is covered by the slave public encrypt key, only that particular slave may decode using his private decrypt key the new primed pseudorandom component message. The master generates one such pseudorandom component message for each slave, covering that message with the slave's public encrypt key.

Next, the master generates a crypto synchronization pattern (CS), block 50. The master terminal now formats the final secure call setup message. This message is formulated with the P1800 protocol (block 51) followed by the SCR1 information (block 52), followed by the pseudorandom component message of each slave in the appropriate time slot. A predetermined amount of filler bits follow the last pseudorandom component message. After the filler bits, the crypto synchronization message is sent to all terminals by the master. The crypto synchronization message indicates the point at which the $$
\begin{aligned}
RNs(1) + RNs(2) + \ldots RNs(n-1) + RNm &= RNs(n)' \\
RNs(1) + RNs(2) + \ldots RNs(n-2) + RNs(n) + RNm &= RNs(n-1)' \\
RNs(1) + RNs(2) + \ldots RNs(n-3) + RNs(n-1) + RNs(n) + RNm &= RNs(n-2)' \\
&\vdots \\
RNs(1) + RNs(3) + \ldots RNs(n) + RNm &= RNs(2)' \\
RNs(2) + RNs(3) + \ldots RNs(n) + RNm &= RNs(1)'
\end{aligned}
\qquad \text{Equation Set (4)}
$$

Examining the last equation of the sets of equations in Equation Set (4) as an example, it can be seen that the new pseudorandom number for slave 1 $RNs(1)'$ is comprised of each of the pseudorandom numbers, of the other slaves and the master. These pseudorandom numsymmetric enrypt/decrypt function is to begin. The master terminal then transmit the formatted message (corresponding primed pseudorandom number) followed by crypto synchronization message, block 53, followed by an EOM, block 54.

Each slave terminal then receives its new primed pseudorandom component message, block 55. In addition, each terminal receives the crypto synchronization message, block 56. Next, each terminal processes the new primed pseudorandom component message by exclusive-ORing the primed pseudorandom component which it received with its own previously stored pseudorandom component, block 57. This exclusive-OR produces a session key. Each of the terminals now have this session key. Therefore, this session key may be used by each terminal's symmetric encrypt/decrypt process to provide secure communications between each of the terminals in a teleconferencing arrangement. A minimal number of messages has been used to achieve security.

Lastly, each terminal processes the crypto synchronization message, block 58. This starts each of the symmetric encrypt/decrypt functions at a predetermined point. Therefore, since each terminal has the key and the starting point, it can encode and decode information transmitted to and received from the other terminals in a secure manner.

Although the preferred embodiment of the invention has been illustrated, and that form described in detail, it will be readily apparent to those skilled in the art that various modifications may be made therein without departing from the spirit of the invention or from the scope of the appended claims.

I claim:

1. A secure teleconferencing method for a key management system included a plurality of terminals previously certified by a common authority of said key management system, said secure teleconferencing method comprising the steps of:
   connecting at least three of said terminals in an unsecure teleconference call via a switching network;
   selecting any one of said connected terminals to be a master terminal;
   selecting all of said connected terminals, except said master terminal, as slave terminals;
   establishing by each terminal that each of said remaining connected terminals is certified by a common certification authority;
   directly developing a single-session session key among said connected terminals; and
   initiating a secure teleconference cell among each of said connected terminals to provide for secure voice and data communication among said connected terminals.

2. A secure teleconferencing method as claimed in claim 1, wherein said step of establishing includes the steps of:
   transmitting an access domain message from said master terminal to each of said slave terminals;
   receiving said access domain message by each of said slave terminals;
   determining by each of said slave terminals whether said master terminal and each said slave terminal have a common access domain;
   responding by each of said slave terminals to said master terminal with an access domain message of each said slave terminal; and
   determining by said master terminal whether each of said slave terminals and said master terminal have a common access domain.

3. A secure teleconferencing method as claimed in claim 2, wherein there is further included the step of organizing transmission and reception of each of slave terminals into time slots for the transmission and reception of messages by each of said terminals.

4. A secure teleconferencing method as claimed in claim 3 wherein there is further included the step of determining by said master terminal whether each of said slave terminals has transmitted its access domain messages.

5. A secure teleconferencing method as claimed in claim 4, wherein said step of establishing further includes the steps of:
   transmitting by said master terminal an authentication message including an identity of said master terminal to each of said slave terminals;
   receiving by each of said slave terminals said authentication message of said master terminal; and
   determining by each of said slave- terminals the identity of said master terminal.

6. A secure teleconferencing method as claimed in claim 5, wherein said step of establishing further includes the steps of:
   transmitting by each of said slave terminals a corresponding authentication message including an identity of said corresponding slave terminal to said master terminal;
   received by said master terminal each of said authentication messages transmitted by each of said corresponding slave terminals; and
   determining by said master terminal the identity of each of said slave terminals.

7. A secure teleconferencing method as claimed in claim 6, wherein there is further included the step of determining whether said authentication message of each of said slave terminals has been received by said master terminal.

8. A secure teleconferencing method as claimed in claim 7, wherein there is further included the steps of:
   displaying by said master terminal said identity of each of said slave terminals; and
   displaying by each of said slave terminals said identity of said master terminal and said identity of each of said slave terminals, except said slave terminal which is displaying.

9. A secure teleconferencing method as claimed in claim 8, wherein said step of directly developing includes the steps of:
   generating by said master terminal a pseudorandom number; and
   storing by said master terminal said pseudorandom number.

10. A secure teleconferencing method as claimed in claim 9, wherein said step of directly developing further includes the steps of:
    generating by each of said slave terminals a corresponding pseudorandom number;
    storing by each of said slave terminals said corresponding pseudorandom number; and
    transmitting by each of said slave terminals said corresponding pseudorandom number to said master terminal in an appropriate time slot.

11. A secure teleconferencing method as claimed in claim 10, wherein said step of directly developing further includes the step of generating a set of pseudorandom numbers by said master terminal, each pseudorandom number of said set corresponding to each of said terminals.

12. A secure teleconferencing method as claimed in claim 11, wherein said step of generating a set of pseudorandom numbers includes the steps of:

generating a pseudorandom number corresponding to each of said terminals connected in said teleconference, each pseudorandom number being an exclusive-OR of each of said set of pseudorandom numbers corresponding to each terminal, except said pseudorandom number corresponding to one terminal which is to receive said pseudorandom number; and transmitting by said master terminal each corresponding pseudorandom number of said set of pseudorandom numbers to said corresponding terminal in an appropriate time slot.

13. A secure teleconferencing method as claimed in claim 12, wherein said step of generating a set of pseudorandom numbers further includes the step of encrypting said set of pseudorandom numbers with an asymmetric RSA-type function.

14. A secure teleconferencing method as claimed in claim 13, wherein said step of establishing further includes the steps of:

receiving in said appropriate time slot by each of said slave terminals said corresponding one of said set of pseudorandom numbers; and exclusive-ORing said pseudorandom number stored by said slave terminal with said received one of said set of pseudorandom numbers to produce said session key.

15. A secure teleconferencing method as claimed in claim 14 said step of establishing further including the step of exclusive-ORing by said master terminal each of said pseudorandom numbers transmitted by said slave terminals with said stored pseudorandom number by said master terminal to produce said session key.

16. A secure teleconferencing method as claimed in claim 15 wherein said step of initiating includes the steps of:

generating a crypto synchronization message by said master terminal;

transmitting said generated crypto synchronization message to each of said slave terminals;

receiving by each of said slave terminals said crypto synchronization message; and initializing with said crypto synchronization message a symmetric encrypt/decrypt function of each of said connected terminals.

17. A secure teleconferencing method via a switching network for establishing a secure teleconference among a plurality of interconnected terminals which have been previously certified by a common authority, said secure teleconferencing method comprising the steps of:

selecting any one of said connected terminals to be a master terminal;

selecting all of said connected terminals, except said master terminal, as slave terminals;

establishing by each terminal that each of said remaining interconnected terminals is certified by a common certification authority;

directly developing a single-session session key among said connected terminals; and initiating a secure teleconference call among each of said interconnected terminals to provide for secure voice and data communication among said interconnected terminals.

18. A secure teleconferencing method via a switching network for establishing a secure teleconference among a plurality of interconnected terminals which have been previously certified by a common authority, said secure teleconferencing method comprising the steps of:

selecting any one of said connected terminals to be a master terminal;

selecting all of said connected terminals, except said master terminal, as slave terminals;

establishing by each terminal that each of said remaining interconnected terminals is certified by a common certification authority; and directly developing a single-session session key among said connected terminals for providing secure voice and data communication among said interconnected terminals.

* * * * *